(12) United States Patent
Lee et al.

(10) Patent No.: US 10,174,657 B2
(45) Date of Patent: Jan. 8, 2019

(54) PLASMA SCR SYSTEM

(71) Applicant: KOREA INSTITUTE OF MACHINERY & MATERIALS, Daejeon (KR)

(72) Inventors: Dae-hoon Lee, Daejeon (KR); Younghoon Song, Daejeon (KR); Kwan-Tae Kim, Daejeon (KR); Sung Hyun Pyun, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 7 days.

(21) Appl. No.: 15/507,327

(22) PCT Filed: Aug. 24, 2015

(86) PCT No.: PCT/KR2015/008812
§ 371 (c)(1),
(2) Date: Feb. 28, 2017

(87) PCT Pub. No.: WO2016/036041
PCT Pub. Date: Mar. 10, 2016

(65) Prior Publication Data
US 2017/0284260 A1 Oct. 5, 2017

(30) Foreign Application Priority Data

Sep. 3, 2014 (KR) ........................ 10-2014-0117134

(51) Int. Cl.
*F01N 3/20* (2006.01)
*F01N 3/30* (2006.01)
(Continued)

(52) U.S. Cl.
CPC ....... *F01N 3/2066* (2013.01); *B01D 53/9431* (2013.01); *F01N 3/30* (2013.01);
(Continued)

(58) Field of Classification Search
CPC . F01N 3/2066; F01N 2240/28; F01N 2610/02
See application file for complete search history.

(56) References Cited

U.S. PATENT DOCUMENTS 7,093,429 B1 * 8/2006 Cho ...................... B01D 53/323
60/286
2001/0002244 A1 * 5/2001 Gieshoff ................ B01D 53/32
423/235
(Continued)

FOREIGN PATENT DOCUMENTS

JP 2004-245091 9/2004
JP 2004245091 A * 9/2004
(Continued)

*Primary Examiner* — Audrey K Bradley
(74) *Attorney, Agent, or Firm* — Lex IP Meister, PLLC

(57) ABSTRACT

A plasma selective catalytic reduction (SCR) system according to an exemplary embodiment of the present invention includes: an exhaust pipe connected to an engine to communicate exhaust gas; a plasma burner installed in a first bypass line connected to the exhaust pipe, and configured to supply fuel to discharged plasma and form flame; a urea solution injector installed in the first bypass line at a rear side of the plasma burner, and configured to inject a urea solution to exhaust gas heated by the flame and generate ammonia; and an SCR catalyst installed in the exhaust pipe at a rear side of the urea solution injector, and configured to reduce a nitrogen oxide included in the exhaust gas with the ammonia.

9 Claims, 7 Drawing Sheets

(51) Int. Cl.
*F01N 3/36* (2006.01)
*B01D 53/94* (2006.01)

(52) U.S. Cl.
CPC ........ *F01N 3/36* (2013.01); *B01D 2251/2067* (2013.01); *B01D 2259/818* (2013.01); *F01N 2240/28* (2013.01); *F01N 2410/00* (2013.01); *F01N 2570/14* (2013.01); *F01N 2610/02* (2013.01); *Y02A 50/2344* (2018.01); *Y02T 10/24* (2013.01)

(56) References Cited

U.S. PATENT DOCUMENTS

| | | | | |
|---|---|---|---|---|
| 2003/0221414 | A1* | 12/2003 | Kim | F01N 3/0892 |
| | | | | 60/275 |
| 2007/0119154 | A1* | 5/2007 | Riegger | B01D 53/90 |
| | | | | 60/286 |
| 2009/0199537 | A1* | 8/2009 | Sisken | F01N 3/035 |
| | | | | 60/273 |

FOREIGN PATENT DOCUMENTS

| | | | |
|---|---|---|---|
| JP | 2005-090400 | | 4/2005 |
| JP | 2006322329 | A * | 11/2006 |
| KR | 10-2010-0111490 | | 10/2010 |
| KR | 10-2013-0033648 | | 4/2013 |
| KR | 10-2014-0104876 | | 8/2014 |
| KR | 20140104876 | A * | 8/2014 |

* cited by examiner

PLASMA SCR SYSTEM

BACKGROUND OF THE INVENTION

(a) Field of the Invention

The present invention relates to a plasma selective catalytic reduction (SCR) system, and more particularly, to a plasma SCR system, which removes a nitrogen oxide in exhaust gas from an SCR catalyst or reproduce the SCR catalyst.

(b) Description of the Related Art

An exhaust system of a diesel engine includes a diesel particulate filter (DPF) trap including a filter so as to collect solid particulate, such as unburned hydrocarbon (HC) included in exhaust gas, and a catalyst device removing a nitrogen oxide (hereinafter, referred to as the "NOx" included in exhaust gas.

The catalyst device, for example, a selective catalytic reduction (hereinafter, referred to as the "SCR") may continuously reduce the NOx even under an atmosphere including oxygen.

The SCR includes an ammonia SCR, an HC SCR, and the like according to the kind of reducing agent used. The ammonia SCR supplies ammonia acting as a reducing agent of an SCR catalyst in the SCR system of an engine.

SUMMARY OF THE INVENTION

The present invention has been made in an effort to provide a plasma SCR system, which generates ammonia from a supplied urea solution, supplies the generated ammonia to a selective catalytic reduction (SCR) catalyst, and removes a nitrogen oxide in exhaust gas.

The present invention has also been made in an effort to provide a plasma SCR system, which reproduces an SCR catalyst with high-temperature gas.

The present invention has also been made in an effort to provide a plasma SCR system, which stabilizes flame by partially recirculating discharge air and discharge plasma at an end portion of an electrode of a plasma burner. An exemplary embodiment of the present invention provides a plasma selective catalytic reduction (SCR) system, including: an exhaust pipe connected to an engine to communicate exhaust gas; a plasma burner installed in a first bypass line connected to the exhaust pipe, and configured to supply fuel to discharged plasma and form flame; a urea solution injector installed in the first bypass line at a rear side of the plasma burner, and configured to inject a urea solution to exhaust gas heated by the flame and generate ammonia; and an SCR catalyst installed in the exhaust pipe at a rear side of the urea solution injector, and configured to reduce a nitrogen oxide included in the exhaust gas with the ammonia.

The plasma burner may include: a first housing supplying discharge air; an electrode, which is mounted in the first housing and sets a discharge gap with the first housing; and a first fuel nozzle, which is installed in the first housing, and injects fuel to a front side of the discharge gap, mixes the injected fuel and the discharge air, and forms ignited flame.

The electrode may be mounted in the mounting part, which seals one side of the first housing, with an insulating member interposed therebetween.

The insulating member may be formed in a cylindrical form mounted in accordance with a cylindrical part of the first housing, and the electrode may be formed in a truncated cone shape, which is gradually decreased from one side of the insulating member.

The plasma burner may further include: a second housing, which is connected to an expanded part expanded from the first housing; and a second fuel nozzle, which is installed in the second housing and supplies fuel to the ignited flame.

The plasma burner may further include: a second housing, which is connected to an expanded part expanded from the cylindrical part of the first housing; and a second fuel nozzle, which is installed in the second housing and supplies fuel to the ignited flame.

The plasma burner may further include: a third housing, which forms a further expanded space than the second housing in a front side of the second fuel nozzle, and is connected to the first bypass line; and an air nozzle, which is installed at a front side of the second fuel nozzle and supplies the air.

The air nozzle may be installed so as to inject air in a circumferential direction to an internal surface of the expanded part from at least one side of the second housing in a diameter direction of the second housing.

The air nozzle may be installed to be inclined at a set angle with respect to the diameter direction of the second housing.

The third housing may include a pipe provided with a plurality of air vents therein, and both ends of the pipe may be opened in a longitudinal direction of the third housing and the pipe may be connected to the air vent in a diameter direction.

The first bypass line may be connected to the exhaust pipe at the engine side through an inlet end, and may be connected to the exhaust pipe at the SCR catalyst side through an outlet end. The plasma SCR system may further include: a three-way opening/closing member provided in an exhaust pipe between the inlet end and the outlet end; and a second bypass line which is connected to the three-way opening/closing member, and the exhaust pipe at a rear side of the SCR catalyst.

The first bypass line may be provided with a plurality of sub lines, and connect the sub lines in parallel, and the plurality of plasma burners may be provided and be provided in the sub lines, respectively.

According to the exemplary embodiments of the present invention, it is possible to reduce and remove a nitrogen oxide included in exhaust gas by processing the large flux of fuel in the plasma burner and heating the exhaust gas with the large quantity of flame, mixing ammonia, which is dissolved by injecting a urea solution to the exhaust gas, and the exhaust gas, and supplying the mixture to the SCR catalyst.

Further, according to the exemplary embodiment of the present invention, it is possible to reproduce the SCR catalyst by making exhaust gas bypass or stopping the engine, and supplying high-temperature gas formed in the plasma burner to the SCR catalyst in a state, in which a urea solution is not injected.

DETAILED DESCRIPTION OF THE EMBODIMENTS

Figure 1:
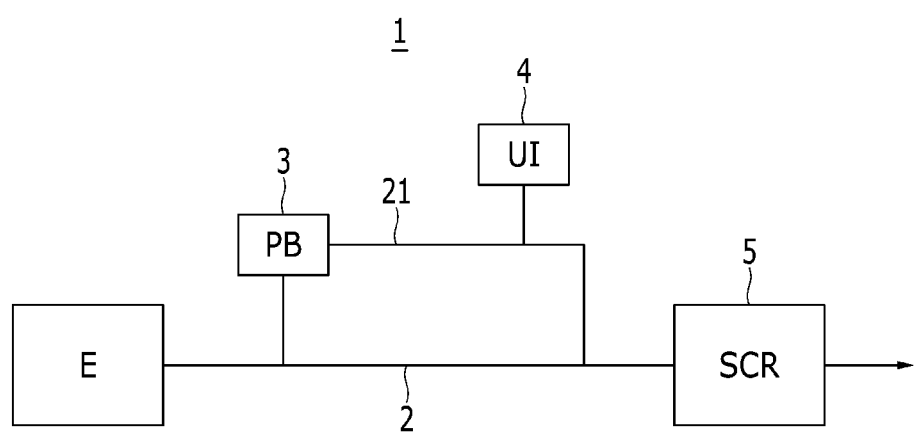
FIG. 1 is a configuration diagram of a plasma selective catalytic reduction (SCR) system according to a first exemplary embodiment of the present invention.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is a configuration diagram of a plasma SCR system according to a first exemplary embodiment of the present invention. Referring to FIG. 1, a plasma selective catalytic reduction (SCR) system 1 of the first exemplary embodiment includes an exhaust pipe 2, which is connected to an engine E and circulates exhaust gas, a first bypass line 21 connected to the exhaust pipe 2, a plasma burner 3 and a urea solution injector 4 installed in the first bypass line 21, and an SCR catalyst 5 installed in the exhaust pipe 2 at a rear side of the first bypass line 21.

For example, the first bypass line 21 may be formed with a size, in which exhaust gas corresponding to 1 to 10% of a flow rate of the exhaust pipe 2 may bypass in the exhaust gas 2. A capacity of the first bypass line 21 may be determined in consideration of a range, in which the exhaust gas may be heated by enthalpy supplied from the plasma burner 3.

The plasma burner 3 is installed in the first bypass line 21 and is configured to form stable flame by supplying fuel to a discharge plasma in the first bypass line 21.

That is, the plasma burner 3 is installed in the first bypass line 21, and generates flame with supplied discharge gas and fuel and heats the exhaust gas while circulating a part of the exhaust gas, and supplies the generated high-temperature gas to the exhaust pipe 2 and the SCR catalyst 5.

Figure 2:
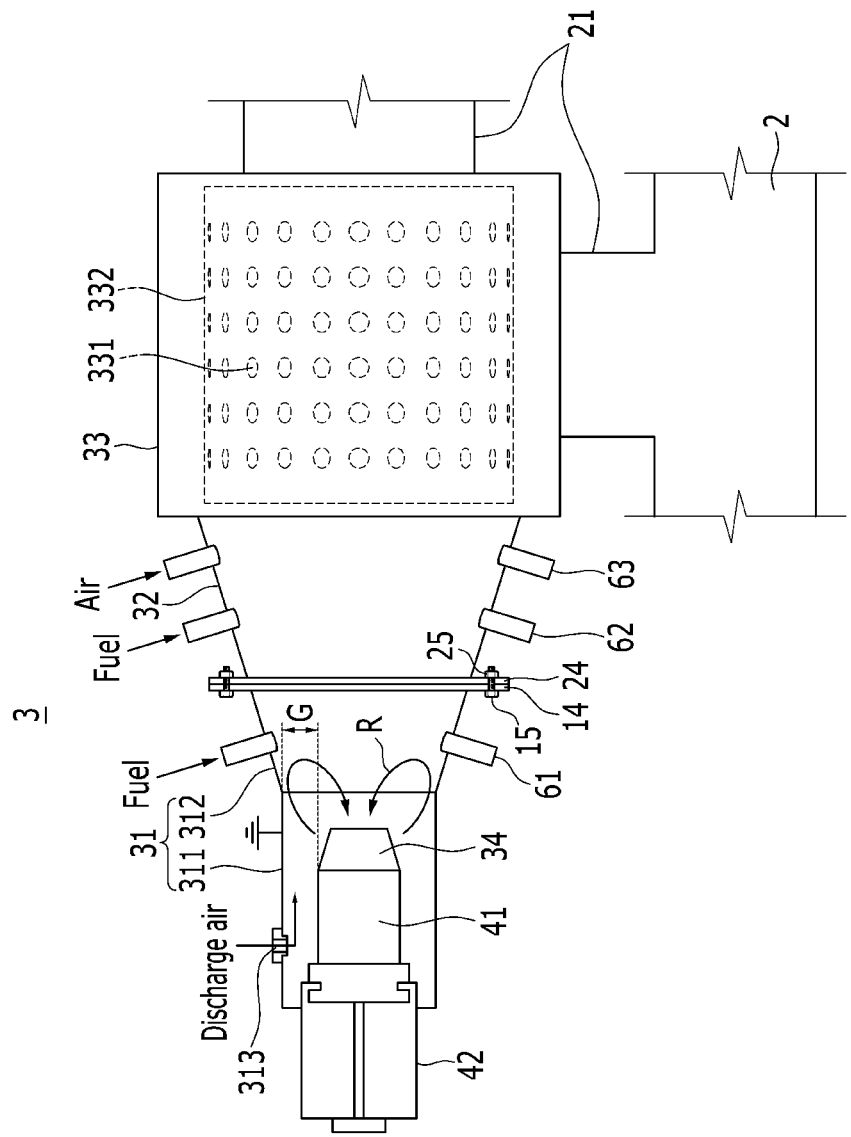
FIG. 2 is a configuration diagram of a plasma burner of FIG. 1.
Figure 3:
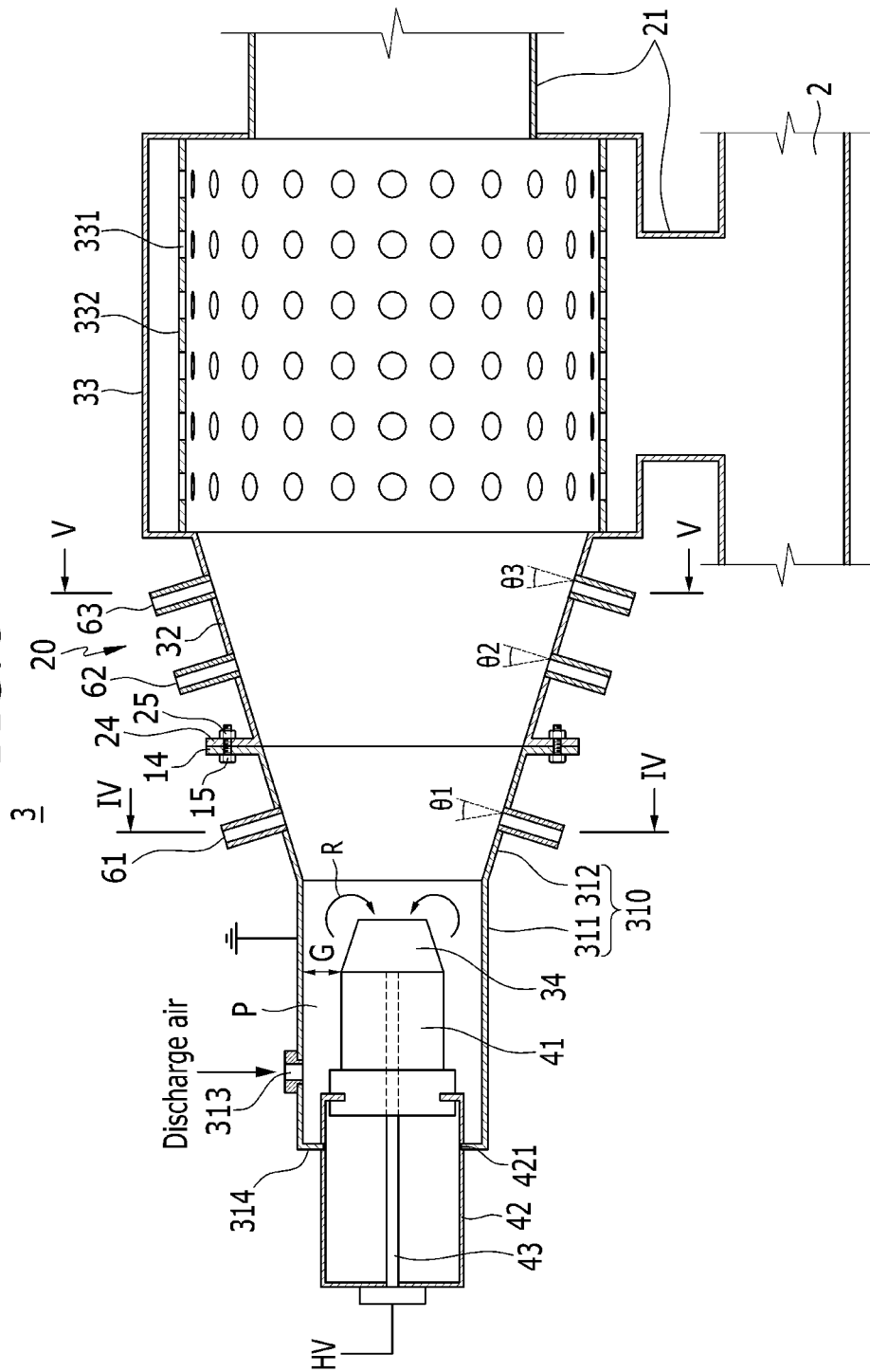
FIG. 3 is a cross-sectional view of FIG. 2.

FIG. 2 is a configuration diagram of a plasma burner of FIG. 1, and FIG. 3 is a cross-sectional view of FIG. 2. Referring to FIGS. 2 and 3, the plasma burner 3 includes a first housing 31 supplying discharge air, an electrode 34 installed in the first housing 31, and a first fuel nozzle 61.

Further, the plasma burner 3 further includes a second housing 32 at a front side of the first fuel nozzle 61, and may further include a second fuel nozzle 62, an air nozzle 63, and a third housing 33 sequentially formed in the second housing 32.

For example, the first housing 31 includes a cylindrical part 311, and an expanded part 312 gradually expanded from an end portion of one side of the cylindrical part 311. An air supply port 313 supplying discharge air is provided in the cylindrical part 311. The first fuel nozzle 61 supplying fuel is installed in the expanded part 312. Although not illustrated, the first fuel nozzle may be installed in the cylindrical part.

Although not illustrated, the first housing 31 may be formed in a structure, in which the cylindrical part is formed in a polygonal part and the expanded part is connected to the polygonal part. In this case, the second housing may be formed in a structure corresponding to the expanded part connected to the polygonal part.

The second housing 32 is connected to the expanded part 312 of the first housing 31, and in this case, the second housing 32 is continuously expanded in response to the expanded part 312. The second fuel nozzle 62 supplying fuel and the air nozzle 63 supplying air are installed in the second housing 32.

The first and second housings 31 and 32 are connected to each other by making an external side of the expanded part 312 face flanges 14 and 24 provided in response to the external side of the expanded part 312 and fastening the flanges 14 and 24 with a bolt 15 and a nut 25. In this case, an internal surface of the first housing 31 and an internal surface of the second housing 32 are connected to an inclined surface while having a structure of being far from the electrode 34 and gradually expanded.

The electrode 34 is embedded in the first housing 31 and sets a discharge gap G with the first housing 31. To this end, the electrode 34 is mounted in a mounting part 42 with an insulating member 41 interposed therebetween.

The mounting unit 42 is coupled to an end portion of the cylindrical part 311 of the first housing 31 at an opposite side of the electrode 34 and seals the end portion of the cylindrical part 311. The mounting part 42 is formed with a coupling recess 421 on an outer peripheral surface thereof, and the cylindrical part 311 of the first housing 31 includes a protruding portion 314 coupled to the coupling recess 421.

Accordingly, one side of the mounting part 42 and one side of the cylindrical part 311 are coupled to each other and are sealed by the coupling recess 421 and the protruding portion 314. A passage P allowing discharge air to flow is formed between the cylindrical part 311 and the insulating member 41. The passage P is connected to a gas supply port 313 and supplies discharge air to a space between the first housing 31 and the electrode 34. The passage P sets a flow rate of discharge air.

The electrode 34 is installed at an end portion of the mounting portion 42 with the insulating member 41 interposed therebetween. In this case, the discharge gap G is formed between the cylindrical part 311 and the electrode 34.

An electric line 43 provided at internal sides of the mounting portion 42 and the insulating member 41 applies a high voltage HV for discharging to the electrode 34. The first housing 31 corresponding to the electrode 34, that is, the cylindrical part 311, is electrically grounded. Accordingly, a high voltage for discharging is set between the internal surface of the cylindrical part 311 and an external surface of the electrode 34.

The insulating member 41 is formed in a cylinder embedded in response to the cylindrical part 311 of the first housing 31. The electrode 34 may be formed in a form of a truncated cone, which is gradually decreased from one side of the insulating member 41. Accordingly, the discharge gap G set between the electrode 34 and the cylindrical part 311 is formed in a minimum size at a start point of the electrode 34, and is gradually increased as being far from the insulating member 41.

For example, the electrode 34 is formed in a shape of a truncated cone and an end portion of the electrode 34 is formed in a vertical cross section. Accordingly, discharge air and discharge plasma are locally recirculated and flow R at the end portion of the electrode 34, thereby stabilizing flame.

Although not illustrated, when the first fuel nozzle is disposed to be closer to the side of the air supply port than a distal end of the electrode and fuel is supplied before the distal end of the electrode (for example, when the fuel is injected to an inclined surface of the electrode 34), the discharge gas and the fuel are mixed and locally recirculated and flow R, thereby further stabilizing flame.

The air nozzle 63 is installed at a front side of the first and second fuel nozzles 61 and 62, to additionally supply air. Accordingly, the air nozzle 63 is installed in the second housing 32 as illustrated in the drawing, but may also be installed in the third housing although not illustrated. The air nozzle 63 additionally sets a flow rate of air.

The first fuel nozzle 61 supplies fuel to a front side of the discharge gap G, and the fuel and the discharge air are mixed to form ignited flame. The second fuel nozzle 62 supplies fuel to the ignited flame, and makes the fuel be particulates and evaporates the fuel. The second fuel nozzle 62 additionally sets the amount of fuel set by the first fuel nozzle 61.

The third housing 33 forms a space further expanded from an end portion of the second housing 32 than the second housing 32 and is connected to the first bypass line 21. The third housing 33 is installed at a front side of the second fuel nozzle 62. Further, although not illustrated, the third housing and the second housing may be connected by the flange like the connection of the first housing and the second housing.

The air nozzle 63 is installed at a front side of the second fuel nozzle 62 and additionally supplies air, and emits flame, which is further formed by reacting the fuel particulates and the evaporated fuel and the air, to the space of the third housing 33. Accordingly, the flow rate of processible fuel may be increased.

Figure 4:
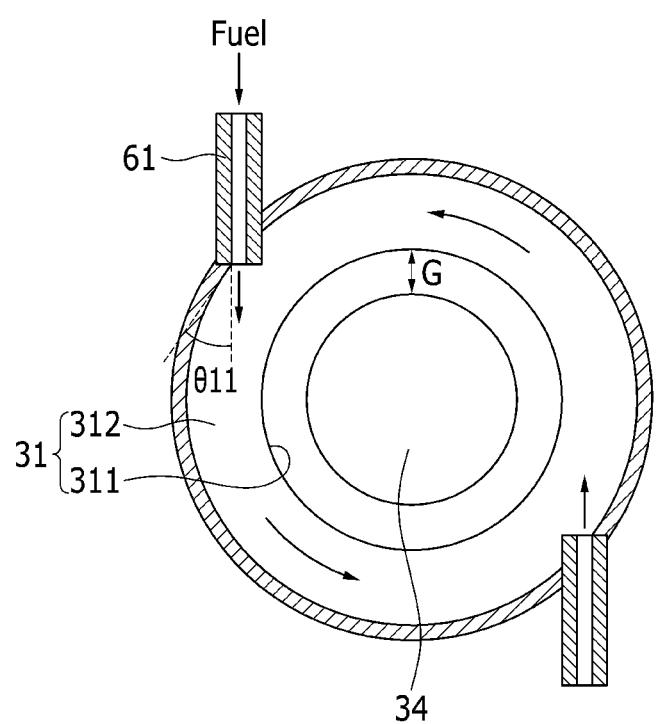
FIG. 4 is a cross-sectional view taken along line IV-IV of FIG. 3.
Figure 5:
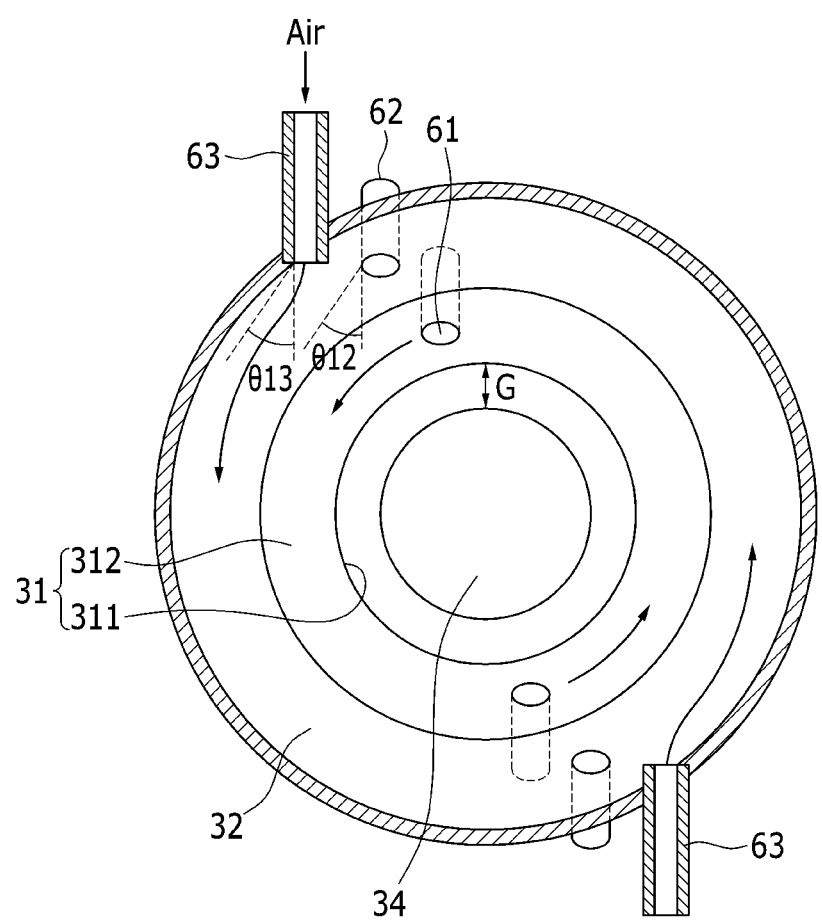
FIG. 5 is a cross-sectional view taken along line V-V of FIG. 3.

FIG. 4 is a cross-sectional view taken along line IV-IV of FIG. 3, and FIG. 5 is a cross-sectional view taken along line V-V of FIG. 3. Referring to FIGS. 4 and 5, the first fuel nozzle 61 is installed in the expanded part 312 of the first housing 31 and supplies fuel to a front side and a surrounding area of the discharge gap G.

For example, the first fuel nozzles 61 are formed in one pair and are installed so as to inject fuel in a circumferential direction to an internal surface of the expanded part 312 at both sides in a direction of a diameter of the expanded part 312. That is, the first fuel nozzle 61 injects fuel in a direction of a tangent of the internal surface of the expanded part 312 or in a direction of a setting angle θ11 crossing the tangent.

Accordingly, the fuel injected from the first fuel nozzle 61 is mixed with discharge air injected and supplied to the front side and the surrounding area of the discharge gap G, and forms ignited flame while generating plasma by a high voltage HV applied between the first housing 31 and the electrode 34. In this case, the first fuel nozzle 61 generates swirl in a circumferential direction within the expanded part 312, thereby enabling the fuel and the discharge air to be uniformly mixed.

Further, the first fuel nozzle 61 may be inclinedly installed at a first angle θ1 set with respect to the direction of the diameter of the expanded part 312 (see FIG. 3). Accordingly, the fuel injected from the first fuel nozzle 61 generates the swirl in the circumferential direction within the expanded part 312 and simultaneously generates jet force in a longitudinal direction of the expanded part 312. Accordingly, the ignited flame discharged from the first housing 31 may be discharged toward the second housing 32 at a high speed.

The second fuel nozzle 62 is installed so as to inject the fuel in a circumferential direction to an internal surface of the second housing 32 from both sides of the second housing 32 in a diameter direction of the second housing 32. That is, the second fuel nozzle 62 injects fuel in a direction of a tangent of the internal surface of the second housing 32 or in a direction of a setting angle θ12 crossing the tangent.

Accordingly, the second fuel nozzle 62 may be installed at a front side, at which the ignited flame travels and supply the fuel to the ignited flame to make the additionally supplied fuel be particulates and evaporate the additionally supplied fuel. In this case, the second fuel nozzle 62 generates swirl in a circumferential direction within the second housing 32, thereby enabling the fuel and the ignited flame to be uniformly mixed.

Further, the second fuel nozzle 62 is inclinedly installed at a second angle θ2 set with respect to the direction of the diameter of the second housing 32 (see FIG. 3). Accordingly, the fuel injected from the second fuel nozzle 62 generates the swirl in the circumferential direction within the second housing 32 and simultaneously generates jet force in a longitudinal direction of the second housing 32. Accordingly, the ignited flame, and the fuel particulates and the evaporated fuel discharged from the second housing 32 may be discharged toward the third housing 33 at a high speed.

The air nozzle 63 is installed at a front side of the second fuel nozzle 62 and supplies air to the fuel, which is made to the particulates and is evaporated by the ingnited flame generated by the plasma discharging and is discharged from the second housing 32.

For example, the air nozzles 63 are formed in one pair, and are installed so as to inject air in a circumferential direction to the internal surface of the second housing 32 at both sides of the second housing 32 in the direction of the diameter of the second housing 32. That is, the air nozzle 63 injects fuel in a direction of a tangent of the internal surface of the second housing 32 or in a direction of a setting angle θ13 crossing the tangent.

Accordingly, the air injected from the air nozzle 63 is injected to the outer regions of the ignited flame and the fuel particulates and the evaporated fuel within the second housing 32, and the injected air is mixed with the ignited flame, and the fuel particulates and the evaporated fuel in the third housing 33 and is further combusted to form and maintain flame. In this case, the air nozzle 63 generates swirl in a circumferential direction within the second housing 32, thereby enabling the ignited flame, the fuel particulates, and the evaporated fuel to be uniformly mixed with the air.

Further, the air nozzle 63 is inclinedly installed at a third angle θ3 set with respect to the direction of the diameter of the second housing 32 (see FIG. 3). Accordingly, the air injected from the air nozzle 63 generates the swirl in the circumferential direction within the second housing 32 and simultaneously generates jet force in the longitudinal direction of the second housing 32. Accordingly, the ignited flame, the fuel particulates, and the evaporated fuel discharged from the second housing 32 may be discharged to an expanded space of the third housing 33 at a high speed.

The plasma burner 3 includes the second fuel nozzles 62 and the air nozzle 63 in addition to the first fuel nozzles 61, thereby improving the quantity of fuel processed. For convenience, in the first exemplary embodiment, the two first and second fuel nozzles 61 and 62 are exemplified as the fuel nozzles, but the larger number of fuel nozzles may be provided.

Referring back to FIGS. 2 and 3, in the plasma SCR system 1 of the exemplary embodiment, the first bypass line 21 is connected to the third housing 33 of the plasma burner 3. That is, the plasma burner 3 may be installed in the first bypass line 21 to allow a part of the exhaust gas flow in and heat and discharge the inflow gas.

Accordingly, unburned fuel included in the flame discharged from the second housing 32 of the plasma burner 3 is further combusted by air included in the exhaust gas to heat the exhaust gas, and the heated high-temperature exhaust gas may be discharged to the first bypass line 21.

The third housing 33 includes a pipe 332 provided with a plurality of air vents 331 in an internal space of the third housing 33. Both ends of the pipe 332 are opened in the longitudinal direction of the third housing 33 to enable the flame and the exhaust gas to flow within the second housing 32, and the pipe 332 connects the internal side and the external side through the air vents 331 in the diameter direction.

Accordingly, the exhaust gas of the engine E supplied to the first bypass line 21 flows into the third housing 33 through an inlet of the first bypass line 21, and flows into the pipe 332 through the air vents 331 of the pipe 332. In this case, the quantity of inflow exhaust gas is controlled, so that the unburned fuel included in the flame may be stably combusted.

That is, the air vents 331 of the pipe 332 decreases a flow speed of the exhaust gas by diversifying an inflow path of the exhaust gas, so that it is possible to prevent the exhaust gas from excessively flowing-in according to a large capacity application condition and stabilize the flame within the pipe 332. In addition to the air nozzle 63, the pipe 332 and the air vents 331 implement the additional stabilization of the flame.

As described above, the high-temperature exhaust gas passing through the third housing 33 of the plasma burner 3 flows into the first bypass line 21 in a heated state. That is, the high-temperature exhaust gas passing through the first bypass line 21 maintains a temperature, at which the urea solution may be dissolved to generate ammonia.

The urea solution injector 4 is installed in the first bypass line 21 at a rear side of the plasma burner 3 and injects the urea solution into the high-temperature exhaust gas. Accordingly, the urea solution is converted into ammonia and is supplied to the SCR catalyst 5 by the high temperature of the exhaust gas heated by the flame. Accordingly, the ammonia may reduce a nitrogen oxide adsorbed to the catalyst and effectively remove the nitrogen oxide from the exhaust gas finally discharged to the first exhaust pipe 2.

The SCR catalyst 5 is installed in the exhaust pipe 2 at a rear side of the urea solution injector 4 and stores a catalyst so as to reduce the nitrogen oxide included in the exhaust gas with the ammonia dissolved from the urea solution.

In the first exemplary embodiment, when the plasma SCR system 1 is normally driven, the urea solution injector 4 may inject the urea solution, the plasma burner 3 may heat the exhaust gas, the heat of the exhaust gas may dissolve the urea solution into ammonia, and the dissolved ammonia may be supplied to the SCR catalyst 5. The dissolved ammonia reduces the nitrogen oxide included in the exhaust gas in the SCR catalyst 5.

Further, in the first exemplary embodiment, when in the plasma SCR system 1, the engine E is stopped and the urea solution injector 4 is stopped, so that the urea solution is not injected, the plasma burner 3 may heat air and heat of the heated air may heat the SCR catalyst 5 (for example, a high temperature of 500° C. or more) to reproduce the catalyst.

Hereinafter, various exemplary embodiments of the present invention will be described. The same configuration as that of the first exemplary embodiment and the previously described exemplary embodiment will be omitted, and the different configuration will be described.

Figure 6:
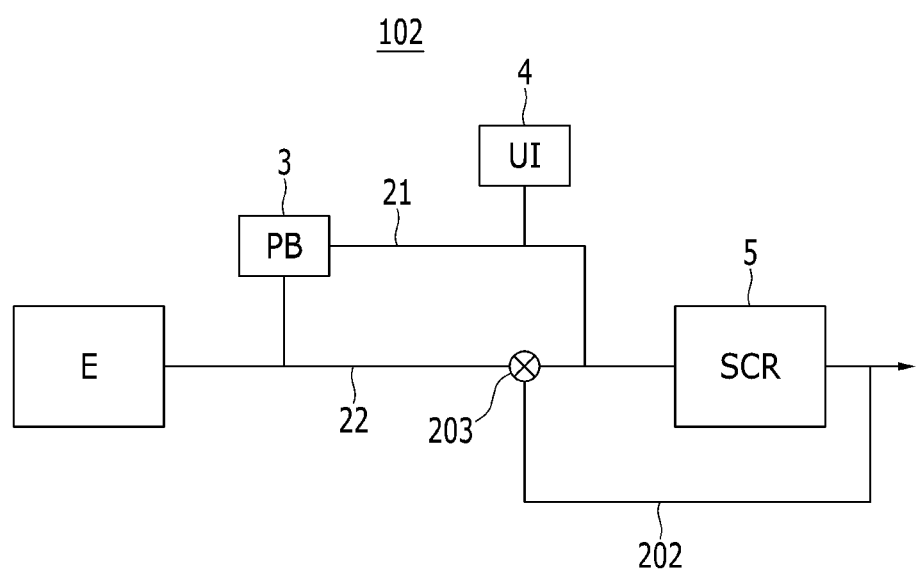
FIG. 6 is a configuration diagram of a plasma SCR system according to a second exemplary embodiment of the present invention.

FIG. 6 is a configuration diagram of a plasma SCR system according to a second exemplary embodiment of the present invention. Referring to FIG. 6, a plasma SCR system 102 according to a second exemplary embodiment of the present invention further includes a three-way opening/closing member 203 and a second bypass line 202 in addition to the plasma SCR system 1 of the first exemplary embodiment.

A first bypass line 21 is connected to an exhaust pipe 22 at an engine E side through an inlet end and is connected to the exhaust pipe 22 at an SCR catalyst 5 through an outlet end.

The three-way opening/closing member 203 is provided in the exhaust pipe 22 between the inlet end and the outlet end of the first bypass line 21. The second bypass line 202 is connected to the three-way opening/closing member 203 through one end thereof and is connected to the exhaust pipe 22 at the rear side of the SCR catalyst 5 through the other end thereof.

Accordingly, exhaust gas of the engine E may pass through the exhaust pipe 22 and the SCR catalyst 5, or pass through the exhaust pipe 22, the first bypass line 21, and the SCR catalyst 5, or pass through the exhaust pipe 22 and the second bypass line 202 according to an opening/closing selective operation of the three-way opening/closing member 203.

That is, when the three-way opening/closing member 203 closes the second bypass line 202 and communicates the exhaust pipe 22 and the SCR catalyst 5, the plasma SCR system 102 may be driven like the plasma SCR system 1 of the first exemplary embodiment.

In the meantime, when the three-way opening/closing member 203 blocks the communication of the exhaust pipe 22 and the SCR catalyst 5 and communicates the exhaust pipe 22 and the second bypass line 202, the exhaust gas of the engine E may be discharged through the second bypass line 202 without passing through the SCR catalyst 5.

In this case, in the second exemplary embodiment, when in the plasma SCR system 102, the engine E is stopped and a urea solution injector 4 is stopped, so that a urea solution is not injected, a plasma burner 3 may heat air and heat of the heated air may heat the SCR catalyst 5 to reproduce the catalyst.

Figure 7:
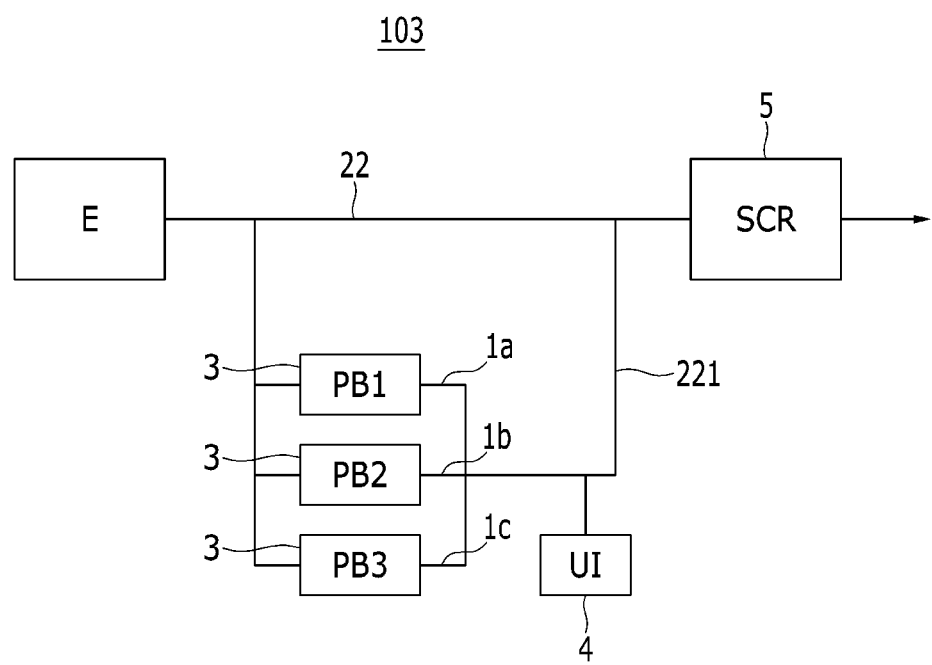
FIG. 7 is a configuration diagram of a plasma SCR system according to a third exemplary embodiment of the present invention.

FIG. 7 is a configuration diagram of a plasma SCR system according to a third exemplary embodiment of the present invention. Referring to FIG. 7, a plasma SCR system 103 according to a third exemplary embodiment includes a plurality of sub lines 1a, 1b, and 1c in a first bypass line 221, and a plurality of plasma burners 3 provided in the sub lines 1a, 1b, and 1c, respectively, in the plasma SCR system 1 of the first exemplary embodiment. That is, the sub lines 1a, 1b, and 1c are connected to the first bypass line 221 halfway in parallel.

The sub lines 1a, 1b, and 1c enable the plurality of plasma burners 3 to be installed when a capacity of the engine E is very large, so that it is possible to reduce and remove a nitrogen oxide by effectively responding to the exhaust gas of large volume of the engine E.

Accordingly, the plasma SCR system 103 according to a third exemplary embodiment may be identically controlled to the plasma SCR system 1 of the first exemplary embodiment, and may select and control one or more of the plurality of plasma burners 3 according to the volume of exhaust gas.

Further, although not illustrated, the plasma SCR system according to the third exemplary embodiment may further include the three-way opening/closing member and the second bypass line applied to the plasma SCR system according to the second exemplary embodiment.

In this case, the plasma SCR system according to the third exemplary embodiment may be identically controlled to the plasma SCR system of the second exemplary embodiment, and may select and control one or more of the plurality of plasma burners according to the volume of exhaust gas.

In the meantime, the first fuel nozzle 61 in the plasma burner 3 of the first exemplary embodiment is installed in the first housing 31 and supplies fuel to the front side and the surrounding area of the discharge gap G. Although not illustrated, the fuel may be supplied while passing through the electrode of the plasma burner and be supplied to the front side and the surrounding area of the discharge gap.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 1, 102, 103: Plasma SCR system | 1a, 1b, 1c: Sub line |
| 2, 22: Exhaust pipe | 3: Plasma burner |
| 4: Urea solution injector | 5: SCR catalyst |
| 14, 24: Flange | 15: Bolt |
| 21, 221: First bypass line | 25: Nut |
| 31: First housing | 32: Second housing |
| 33: Third housing | 34: Electrode |
| 41: Insulating member | 42: Mounting part |
| 43: Electric line | 61: First fuel nozzle |
| 62: Second fuel nozzle | 63: Air nozzle |
| 202: Second bypass line | 203: Three-way opening/closing member |
| 311: Cylindrical part | 312: Expanded part |
| 313: Air supply port | 314: Protruding portion |
| 331: Air vent | 332: Pipe |
| 421: Coupling recess | E: Engine |
| G: Discharge gap | P: Passage |
| θ1, θ2, θ3: First, second, third angle | θ11, θ12, θ13: Setting angle |

What is claimed is:

1. A plasma selective catalytic reduction (SCR) system, comprising:
an exhaust pipe connected to an engine to communicate exhaust gas;
a plasma burner installed in a first bypass line connected to the exhaust pipe, and configured to supply fuel to discharged plasma and form flame;
a urea solution injector installed in the first bypass line at a rear side of the plasma burner, and configured to inject a urea solution to exhaust gas heated by the flame and generate ammonia; and
an SCR catalyst installed in the exhaust pipe at a rear side of the urea solution injector, and configured to reduce a nitrogen oxide included in the exhaust gas with the ammonia;
wherein:
the plasma burner includes:
a first housing supplying discharge air;
an electrode, which is mounted in the first housing and sets a discharge gap with the first housing; and
a first fuel nozzle, which is installed in the first housing, and injects fuel to a front side of the discharge gap, mixes the injected fuel and the discharge air, and forms ignited flame,
wherein:
the electrode is mounted in a mounting part, which seals one side of the first housing, with an insulating member interposed therebetween, and
wherein:
the insulating member is formed in a cylindrical form mounted in accordance with a cylindrical part of the first housing, and
the electrode is formed in a truncated cone shape, which is gradually decreased from one side of the insulating member.

2. The plasma SCR system of claim 1, wherein:
the plasma burner further includes:
a second housing, which is connected to an expanded part expanded from the first housing; and
a second fuel nozzle, which is installed in the second housing and supplies fuel to the ignited flame.

3. The plasma SCR system of claim 1, wherein:
the first bypass line includes an inlet end which is connected to a portion of the exhaust pipe adjacent to the engine and an outlet end which is connected to a portion of the exhaust pipe adjacent to the SCR catalyst, and
the plasma SCR system further includes: a three-way opening/closing member provided in the exhaust pipe between the inlet end and the outlet end; and
a second bypass line which is connected to the three-way opening/closing member, and the exhaust pipe at a rear side of the SCR catalyst.

4. The plasma SCR system of claim 1, wherein:
the plasma burner further includes:
a second housing, which is connected to an expanded part expanded from the cylindrical part of the first housing; and
a second fuel nozzle, which is installed in the second housing and supplies fuel to the ignited flame.

5. The plasma SCR system of claim 4, wherein:
the plasma burner further includes:
a third housing, which forms a further expanded space than the second housing in a front side of the second fuel nozzle, and is connected to the first bypass line; and
an air nozzle, which is installed at a front side of the second fuel nozzle and supplies the air.

6. The plasma SCR system of claim 5, wherein:
the third housing includes a pipe provided with a plurality of air vents therein, and
both ends of the pipe are opened in a longitudinal direction of the third housing and the pipe is connected to the plurality of air vents in a diameter direction.

7. The plasma SCR system of claim 5, wherein:
the air nozzle is installed so as to inject air in a circumferential direction to an internal surface of the expanded part from at least one side of the second housing in a diameter direction of the second housing.

8. The plasma SCR system of claim 7, wherein:
the air nozzle is installed to be inclined at a set angle with respect to the diameter direction of the second housing.

9. A plasma selective catalytic reduction SCR system, comprising:
an exhaust pipe connected to an engine to communicate exhaust gas;
a plurality of plasma burners installed in a first bypass line connected to the exhaust pipe, and configured to supply fuel to discharged plasma and form flame;
a urea solution injector installed in the first bypass line at a rear side of the plurality of plasma burners, and configured to inject a urea solution to exhaust gas heated by the flame and generate ammonia; and an SCR catalyst installed in the exhaust pipe at a rear side of the urea solution injector, and configured to reduce a nitrogen oxide included in the exhaust gas with the ammonia, wherein, the first bypass line is provided with a plurality of sub lines, and connects the sub lines in parallel, and the plurality of plasma burners is provided in the sub lines, respectively.

* * * * *